(12) United States Patent
Olaru

(10) Patent No.: US 7,244,118 B2
(45) Date of Patent: Jul. 17, 2007

(54) HOT RUNNER NOZZLE AND MANIFOLD SEAL

(75) Inventor: George Olaru, Toronto (CA)

(73) Assignee: Mold-Masters Limited, Georgetown, Ontario (CA)

( * ) Notice: Subject to any disclaimer, the term of this patent is extended or adjusted under 35 U.S.C. 154(b) by 293 days.

(21) Appl. No.: 10/936,726

(22) Filed: Sep. 9, 2004

(65) Prior Publication Data
US 2005/0064063 A1 Mar. 24, 2005

Related U.S. Application Data

(60) Provisional application No. 60/501,075, filed on Sep. 9, 2003.

(51) Int. Cl.
*B29C 45/00* (2006.01)
(52) U.S. Cl. ............ 425/568; 425/549; 425/567; 425/562; 425/563; 425/564; 425/565; 425/566
(58) Field of Classification Search .......... 425/562, 425/563, 564, 565, 566, 549, 567, 568
See application file for complete search history.

(56) References Cited

U.S. PATENT DOCUMENTS

| | | | |
|---|---|---|---|
| 4,043,726 A | 8/1977 | Tsunemoto et al. | |
| 4,576,567 A | 3/1986 | Gellert | |
| 4,588,367 A | 5/1986 | Schad | |
| 4,662,837 A | 5/1987 | Anderson | |
| 4,669,971 A | 6/1987 | Gellert | |
| 4,682,945 A | 7/1987 | Schad | |
| 4,777,348 A | 10/1988 | Gellert | |
| 5,049,062 A | 9/1991 | Gellert | |
| 5,125,827 A | 6/1992 | Gellert | |
| 5,269,676 A | 12/1993 | Gellert | |
| 5,324,191 A | 6/1994 | Schmidt | |
| 5,374,182 A | 12/1994 | Gessner | |
| 5,507,637 A * | 4/1996 | Schad et al. ............ | 425/549 |
| 5,518,393 A | 5/1996 | Gessner | |
| 5,609,893 A | 3/1997 | Eastwood | |
| 5,896,640 A | 4/1999 | Lazinski et al. | |
| 6,062,846 A | 5/2000 | Kalemba | |
| 6,164,954 A | 12/2000 | Mortazavi et al. | |
| 6,220,851 B1 | 4/2001 | Jenko | |
| 6,261,084 B1 | 7/2001 | Schmidt | |

(Continued)

FOREIGN PATENT DOCUMENTS

CA   2 406 162 A1   10/2001

(Continued)

OTHER PUBLICATIONS

International Search Report and Written Opinion for International Application No. PCT/CA2004/001650, Canadian Patent Office, CA, mailed on Jan. 27, 2005.

*Primary Examiner*—Yogendra N. Gupta
*Assistant Examiner*—Maria Veronica Ewald
(74) *Attorney, Agent, or Firm*—Medler Ferro PLLC

(57) ABSTRACT

An injection molding apparatus includes combined sealing elements located between a nozzle head of an injection molding nozzle and a mold plate. The sealing elements are arranged so that they force the nozzle head toward an outlet surface of a manifold and provide a seal therebetween over a range of temperatures.

32 Claims, 14 Drawing Sheets

U.S. PATENT DOCUMENTS

| | | |
|---|---|---|
| 6,309,207 B1 | 10/2001 | Kalemba |
| 6,368,542 B1 | 4/2002 | Steil et al. |
| 6,506,045 B2 | 1/2003 | Corocher et al. |
| 6,669,462 B1 | 12/2003 | Jenko |
| 6,860,732 B2 * | 3/2005 | Babin et al. ............... 425/549 |
| 2003/0143298 A1 | 7/2003 | Blais |

FOREIGN PATENT DOCUMENTS

| | | |
|---|---|---|
| CA | 2 474 024 A1 | 8/2003 |
| DE | 44 04 894 | 1/1995 |
| JP | 10-156892 | 6/1998 |
| WO | WO 01/78962 | 10/2001 |
| WO | WO 01/81066 | 11/2001 |

* cited by examiner

HOT RUNNER NOZZLE AND MANIFOLD SEAL

CROSS-REFERENCE TO RELATED APPLICATIONS

This application claims the benefit of provisional application 60/501,075, filed Sep. 9, 2003, which is hereby incorporated by reference in its entirety herein.

BACKGROUND OF THE INVENTION

1. Field of the Invention

The present invention relates generally to an injection molding apparatus and and method of injection molding and, in particular, to an apparatus and method that prevents or limits leakage of molten material between a hot runner nozzle and a manifold.

2. Background of the Invention

A common problem associated with hot runner injection molding systems is the leaking of molten plastic that can occur between the manifold and the nozzle assembly. This is undesirable because the leaked material often remains in the injection molding system and crystallizes or degrades and as a result may contaminate subsequent injection molding operations. In addition, the leaking of material may cause servicing of the injection molding system to be more difficult.

Another problem with leaking is that some materials are corrosive or otherwise aggressive to materials within the nozzle assembly. The continued presence of such materials can result in decreased lifetimes of the components.

The components of the injection molding system are subjected to thermal expansion and contraction during each molding cycle as well as during start up and shut down of the system. The materials and clearances of parts within the injection molding system must be selected to reduce leaking within the operating temperature range since different components often exhibit different thermal expansion due to material properties and specific dimensions. However, since the parts are generally designed for a specific operating temperature range, operation outside this operating temperature window often results in unacceptable leaking.

In order to accommodate various plastic materials and/or injection processes, it is desirable for the available operating temperature range of the injection molding system to be as large as possible. A narrow operating temperature range limits the use of the injection molding system to specific materials and processes.

Leakage of molten material at the interface between a manifold and nozzles of an injection molding apparatus may also occur because of bending of the manifold caused by the injection pressure. A small gap between a lower surface of the manifold and a head portion of a nozzle may form when a manifold bends providing a path for leakage of molten material. The size of gaps between the manifold and nozzles in an injection system may be different for each nozzle and as a result leakage from those gaps is difficult to control using the current state of the art nozzle designs.

Therefore, there is a need to reduce the occurrence of leaking between the manifold and the nozzle assembly for a variety of molding conditions and for large operating temperature ranges.

SUMMARY OF THE INVENTION

The injection molding apparatus according to an embodiment of the present invention includes a manifold, a nozzle located in an opening in a mold plate, and a combination seal located between a nozzle head and the mold plate. The manifold generally has a manifold melt channel for receiving a melt stream of moldable material under pressure from a source. The nozzle head has an inlet surface that abuts an outlet surface of the manifold, and a nozzle channel that receives the melt stream from an outlet of the manifold channel. The combination seal may be constructed from separate sealing elements that are configured so that one contacts both the nozzle head and mold plate in both cold and heated conditions while the other only contacts both the nozzle head and mold plate in the heated condition. Thus, the sealing elements provide a sealing force between the nozzle and manifold in cold and heated conditions and generally over a wide range of operating temperatures. Accordingly, standard nozzles can be used for a variety of molding applications by selecting the proper combination of materials and designs for each seal member of the combination seal.

Another embodiment of the present invention includes a manifold, a nozzle located in an opening in a mold plate, a combination seal located between a nozzle head and the mold plate, and an insert located in the nozzle head. The manifold generally has a manifold melt channel for receiving a melt stream of moldable material under pressure from a source. The nozzle has an insert that abuts an outlet surface of the manifold, and a nozzle channel that receives the melt stream from an outlet of the manifold channel. The combination seal provides a sealing force between the nozzle and manifold over a range of temperatures.

Other aspects and features of the present invention will become apparent to those of ordinary skill in the art upon review of the following figures and detailed description.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
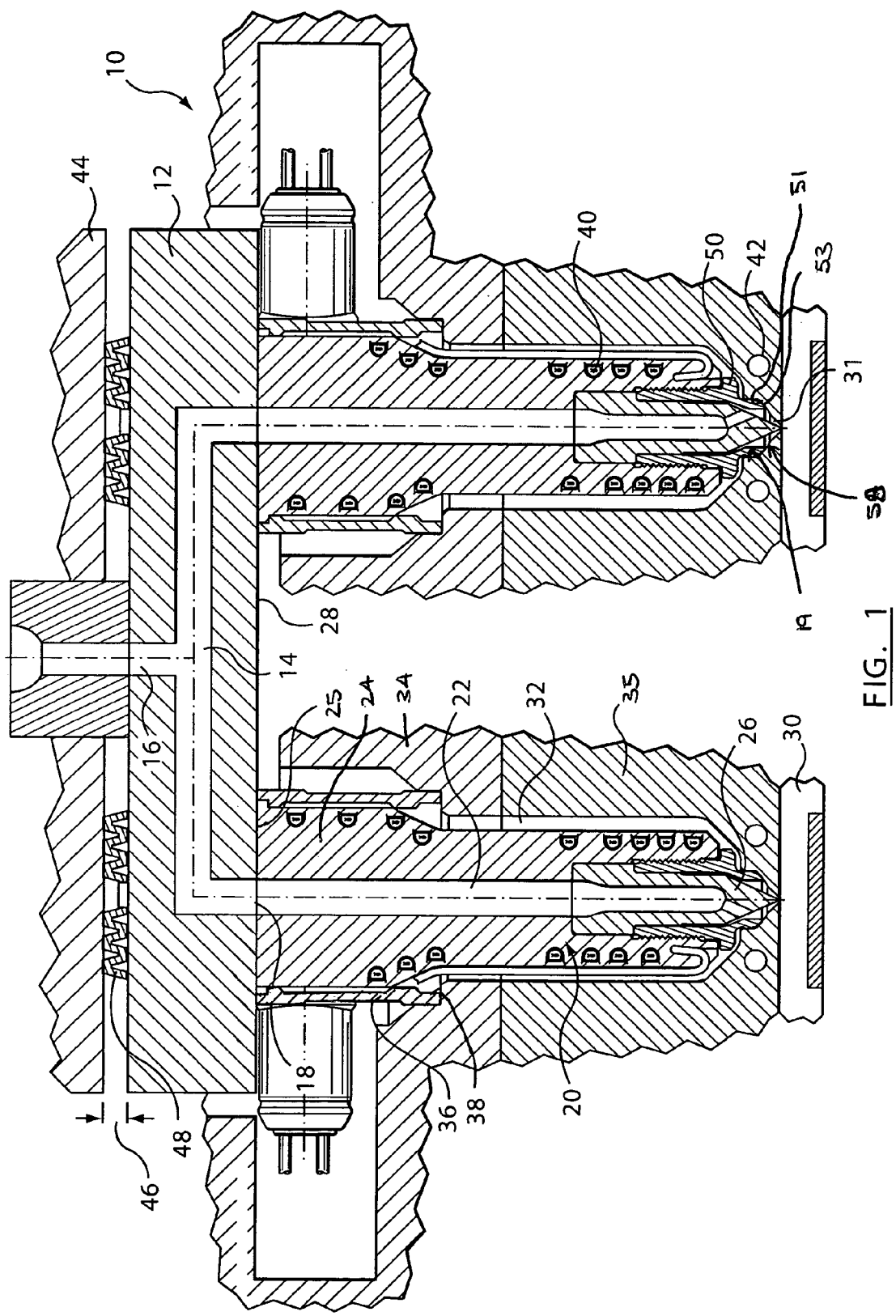
FIG. 1 is a sectional view of an injection molding apparatus.

An injection molding apparatus, shown in FIG. 1, is generally indicated by reference numeral 10. The injection molding apparatus includes a manifold 12 having a manifold melt channel 14 extending therethrough. As shown, manifold 12 is a floating manifold. As such, manifold 12 is not fixed within the injection molding apparatus and therefore is movable in order to compensate for thermal expansion and contraction of adjacent components. An inlet 16 of manifold channel 14 receives a melt stream of moldable material from a machine nozzle (not shown). The melt stream flows through manifold channel 14 to outlets 18. Manifold heaters (not shown) are provided in manifold 12 to maintain manifold 12 and the melt stream at a desired temperature.

A backing plate 44 is located adjacent manifold 12 and is offset by a gap 46. A spring 48 is provided between backing plate 44 and manifold 12. Spring 48 absorbs movement of manifold 12 caused by thermal expansion of the components of the system, which occurs when manifold 12 and nozzles 20 are heated. Spring 48 may alternatively be a rigid spacer.

Nozzles 20 are located between manifold 12 and respective mold cavities 30. The nozzles are received in openings 32 provided in a first mold plate 34 and a second mold plate 35. Although first and second mold plates 34, 35 are shown, they may be replaced by a single mold plate or a modular mold plate assembly. Each nozzle 20 includes a nozzle head 24 and a nozzle tip 26. A flange 36 of nozzle head 24 is generally annular and abuts a shoulder 38 of first mold plate 34. Flange 36 is provided to force an inlet surface 25 of nozzle head 24 against an outlet surface 28 of manifold 12 when injection molding apparatus 10 is heated to an operating temperature. This provides a seal between nozzle 20 and manifold 12.

Each nozzle 20 includes a nozzle melt channel 22 for receiving the melt stream from the respective manifold outlet 18 and delivering the melt stream to the respective mold cavity 30 through respective mold gates 31. Mold gates 31 are provided at the entrance to the mold cavities 30, adjacent nozzle tips 26 of the nozzles 20.

A tip retainer 50 is provided between nozzle tip 26 and an inner wall of opening 32. Tip retainer 50 prevents backflow of melt from traveling further into opening 32 from nozzle tip 26 by providing a sealing portion 19 that contacts second mold plate 35 at an inner surface of opening 32 within a melt chamber 58. Melt chamber 58 forms a portion of opening 32 adjacent to mold gate 31. As shown, an end surface 51 of tip retainer 50 is tapered and abuts a tapered surface 53 of melt chamber 58. The abutment of end surface 51 and tapered surface 53 restricts expansion of nozzle 20 in the direction of mold gate 31.

Each nozzle 20 is further provided with a heater 40, which helps to maintain the melt stream at a desired temperature as it passes through nozzle 20. Cooling channels 42 are located adjacent the mold cavities 30 in order to aid in the cooling thereof.

In operation, a melt stream of moldable material is injected from a machine nozzle and flows through manifold melt channel 14, nozzle melt channel 22 and past mold gate 31 into mold cavity 30. The melt in mold cavity 30 is then cooled creating a molded part that is subsequently ejected from injection molding apparatus 10.

Figure 1A:
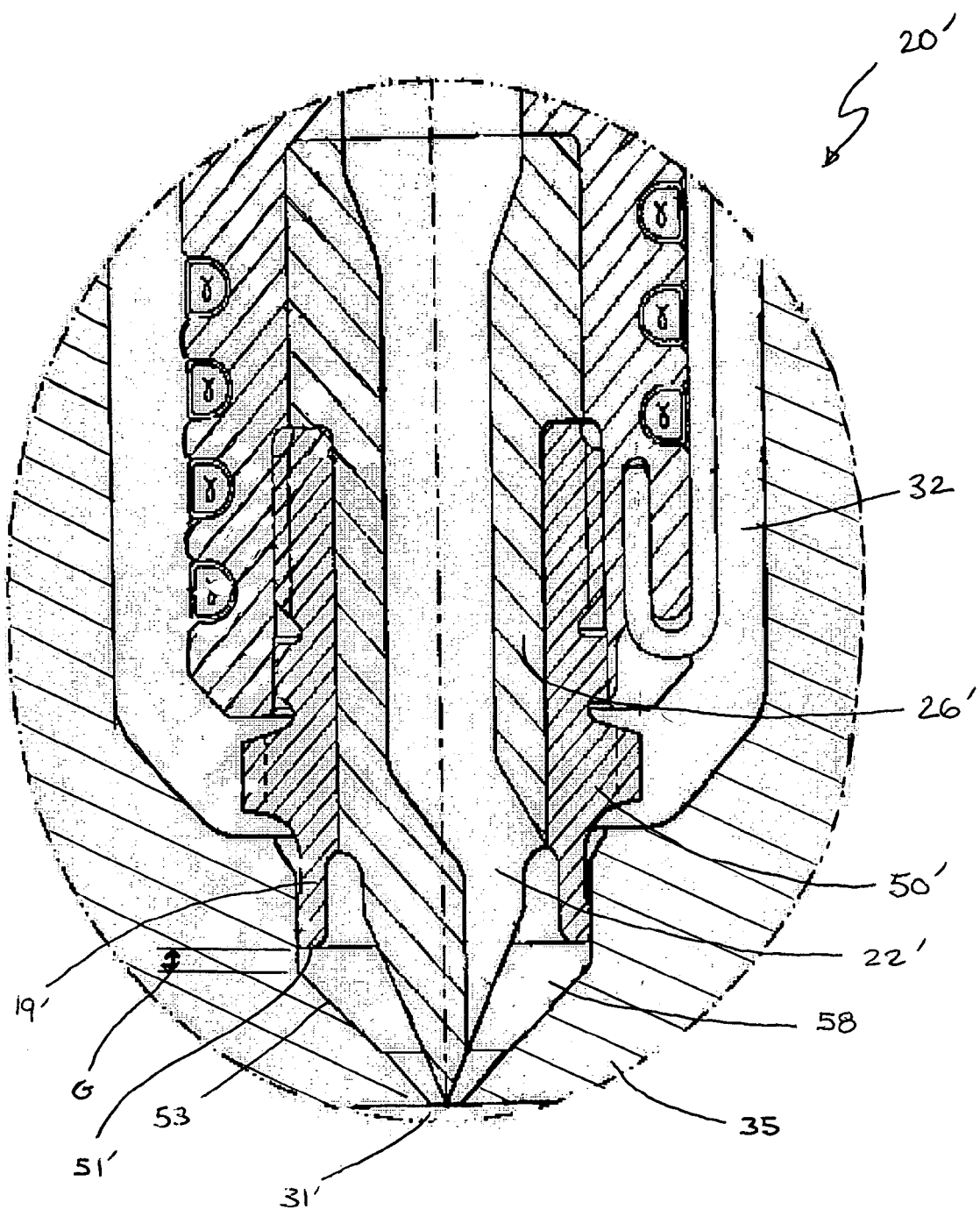
FIG. 1a is a cross sectional view of a tip portion of a nozzle included in an injection molding apparatus according to another embodiment of the present invention.

A detailed view of a tip portion of a nozzle included in an injection molding apparatus according to another embodiment of the present invention is shown in FIG. 1a. The tip portion of a nozzle 20' includes a tip retainer 50', and a nozzle tip 26'. Tip retainer 50' has a sealing portion 19' that contacts second mold plate 35 on the inner surface of opening 32 within melt chamber 58. In operation, melt flows thorough a nozzle melt channel 22' into melt chamber 58 and into a mold cavity through a mold gate 31'. During thermal expansion of a manifold and nozzle 22', nozzle tip 26' and tip retainer 50' are able to expand towards mold gate 31' over a small distance, thereby reducing a gap G between an end surface 51' of tip retainer 50' and tapered surface 53 of melt chamber 58. Similar to nozzle 20 shown in FIG. 1, nozzle 20' will also thermally expand toward a manifold when heated. The ability of nozzle 20' to expand toward gate 31' in addition to a manifold generally makes the operation of nozzle 20' less reliant on manufacturing tolerances.

Figure 2:
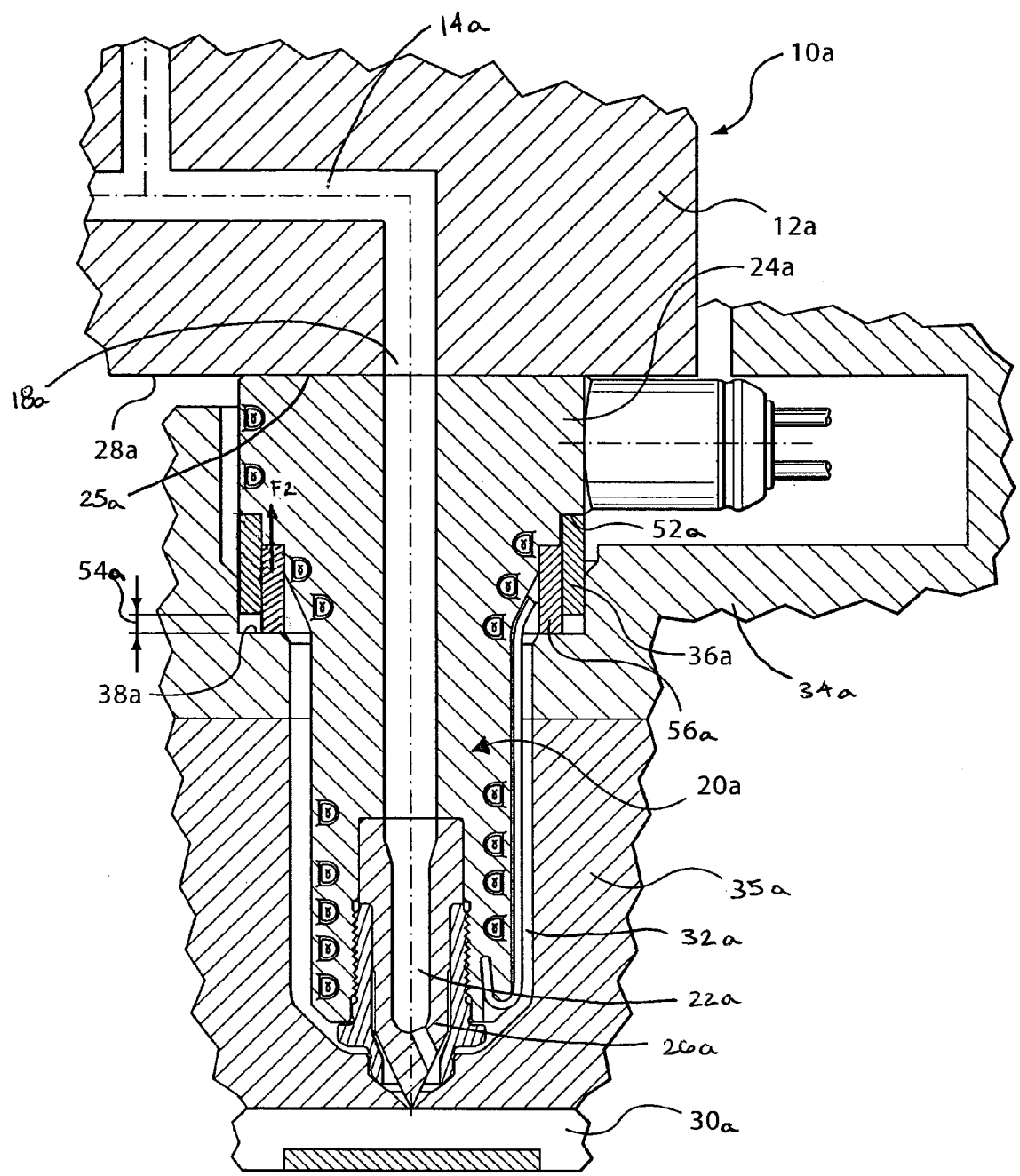
FIG. 2 is a sectional view of a portion of an injection molding apparatus according to an embodiment of the present invention, shown in a cold condition.
Figure 3:
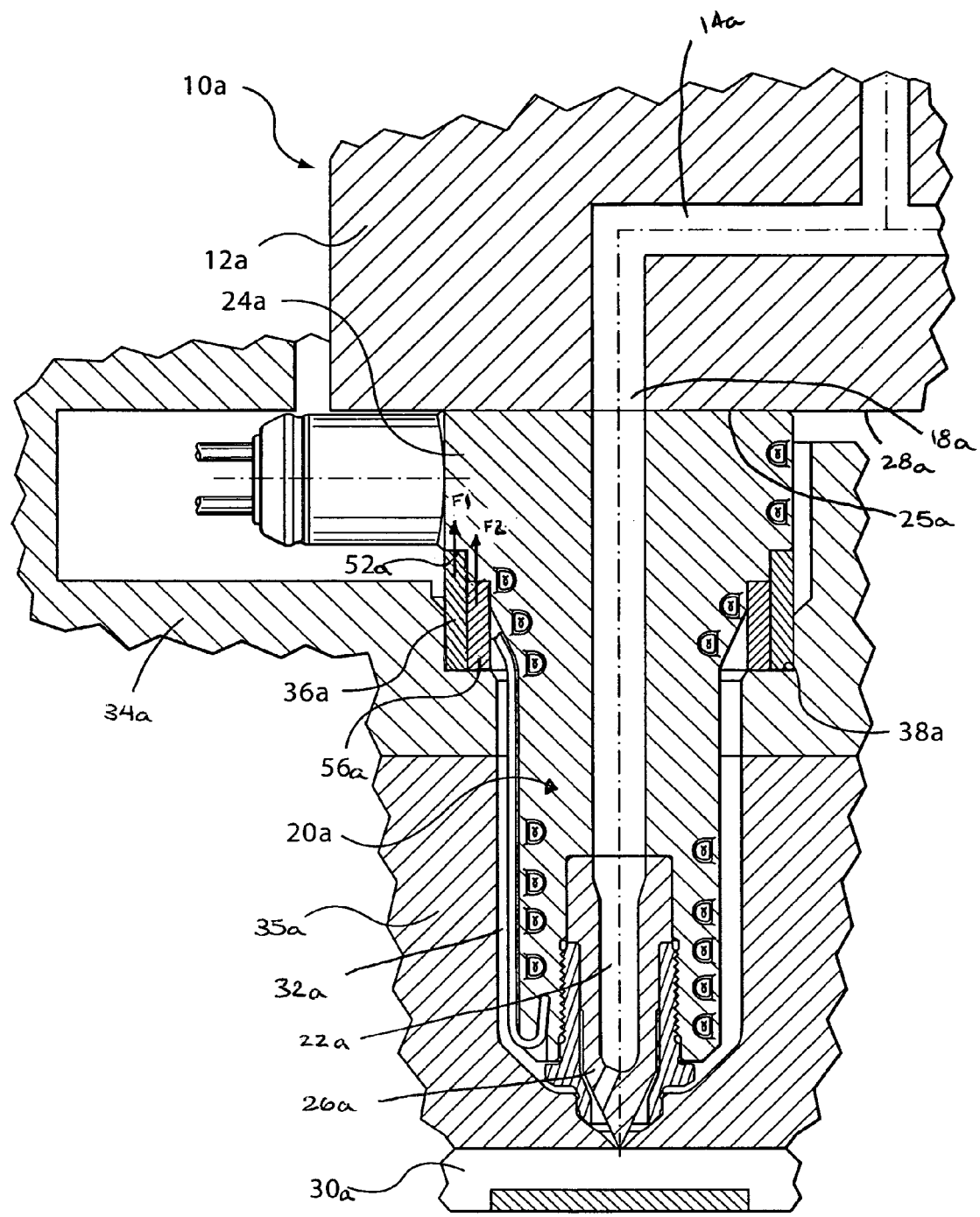
FIG. 3 is a sectional view of the injection molding apparatus of FIG. 2, shown in an operating condition.

Referring now to FIGS. 2 and 3, a portion of an injection molding apparatus 10a is shown. Like reference numerals have been used to denote parts similar to those shown in FIG. 1. Injection molding apparatus 10a includes a manifold 12a having a manifold melt channel 14a extending therethrough, a nozzle 20a located between manifold 12a and respective mold cavity 30a and within a first mold plate 34a and second mold plate 35a. Nozzle 20a is received in opening 32a provided in first and second mold plates 34a, 35a.

In FIG. 2, injection molding apparatus 10a is shown in a cold condition. The cold condition occurs prior to heating the injection molding apparatus 10a up to an operating temperature. In the cold condition, nozzle 20a, manifold 12a and the other components are in a non-expanded state, as indicated by a gap 54a that is present between a first sealing element 36a and a shoulder 38a of first mold plate 34a. FIG. 3 shows the injection molding apparatus 10a in an operating, or heated, condition. As shown, gap 54a is no longer present due to thermal expansion.

Nozzle 20a is similar to nozzle 20, in that it includes a nozzle head 24a, a nozzle tip 26a, and a nozzle melt channel 22a for receiving a melt stream from a manifold outlet 18a and delivering the melt stream to mold cavity 30a through mold gate 31a. However, nozzle 20a includes first sealing element 36a that is not integral with nozzle head 24a. In the embodiment shown, first sealing element 36a, is a separate annular component that is received in a groove 52a of nozzle head 24a. First sealing element 36a may be coupled to nozzle head 24a using a suitable method, such as press fitting, brazing, soldering or adhesively bonding, for example. First sealing element 36a may have thermal expansion characteristics similar to the nozzle. A second sealing element 56a is also generally annular and located between nozzle head 24a and shoulder 38a and between first sealing element 36a and nozzle 20a.

First sealing element 36a and second sealing element 56a may have different response characteristics when subjected to compressive forces and different thermal expansion characteristics. The different response characteristics can be acquired by using materials that have different spring constants, and/or by altering the respective sizes and shapes of sealing elements 36a and 56a thereby altering the compressibility of the particular element. Different thermal expansion characteristics can be acquired by utilizing materials having different moduli of elasticity or coefficients of thermal expansion for sealing elements 36a and 56a, and/or by altering the respective sizes and shapes of sealing elements 36a and 56a. Any of the above arrangements may be used provided that the combination of sealing elements provide sufficient force to seal an inlet surface 25a of nozzle head 24a with an outlet surface 28a of manifold 12a over the desired temperature range.

The sealing elements may be constructed from any material known in the art that is suitable for an injection molding apparatus, such as titanium or titanium alloys, various steel alloys, ceramics and graphite. For example the sealing elements may be made of tool steel, such as H13, P20, S7, or NAK55; stainless steel; Grafoil; Zirconia; Alumina; VESPEL manufactured by Dupont, or PEEK manufactured by Victrex. The material of the sealing elements may be selected so that the seals are less conductive than the material used for the nozzle. For example, in an apparatus that utilizes a nozzle made of tool steel it may be beneficial to construct the sealing elements out of a material such as titanium or a ceramic so that heat conduction between the nozzle and the mold plate is reduced. In addition, although the sealing elements are described and shown as generally annular with a rectangular cross-section, they may also have tapered or curved walls and they need not be a full annular wall. For example, the sealing elements may be semi-circular. The sealing elements may also include ridges or have a varying cross-section.

In operation, injection molding apparatus 10a starts in the cold condition of FIG. 2, in which all of the components are at generally the same ambient temperature. In the cold condition, second sealing element 56a is in contact with both nozzle head 24a and shoulder 38a of first mold plate 34a and exerts a force F2 on nozzle head 24a in the direction of outlet surface 28a of manifold 12a. In the cold condition, second sealing element 56a provides the entire sealing force between outlet surface 28a and inlet surface 25a because first sealing element 36a is spaced from shoulder 38a by gap 54a.

As manifold 12a and nozzle 20a are heated to the operating temperature, gap 54a between first sealing element 36a and shoulder 38a decreases until first sealing element 36a contacts shoulder 38a, as shown in FIG. 3. After first sealing element 36a contacts shoulder 38a, first sealing element 36a applies a force F1 to nozzle head 24a which causes a sealing force between inlet surface 25a and outlet surface 28a. Second sealing element 56a may continue to apply force F2 thereby providing additional sealing force between inlet surface 25a and outlet surface 28a unless second sealing element 56a loses contact with either shoulder 38a or nozzle head 24a. If second sealing element 56a loses contact, first sealing element 36a provides the entire sealing force between inlet surface 25a and outlet surface 28a by applying force F1 to nozzle head 24a.

In this arrangement, first sealing element 36a and second sealing element 56a act in parallel to apply a sealing force between inlet surface 25a of nozzle head 24a and outlet surface 28a of manifold 12a as shown by forces F1 and F2 in FIG. 3. As described above, the two sealing elements act either independently or in parallel over a temperature range to provide a seal between nozzle 20a and manifold 12a. As a result, a seal may be maintained between nozzle 20a and manifold 12a over a larger temperature range than would be available with either sealing element independently. Therefore, the possibility of leakage is reduced over a temperature range that may span beyond a typical operating temperature range and as a result allows for a larger operating temperature range.

Providing a larger operating temperature range allows plastics having significantly different processing temperatures to be injected using the same injection molding apparatus. In addition, providing a pair of sealing elements may allow the nozzle-manifold seal to withstand a higher injection pressure over a temperature range wherein the pair of seals are acting in parallel.

Figure 4:
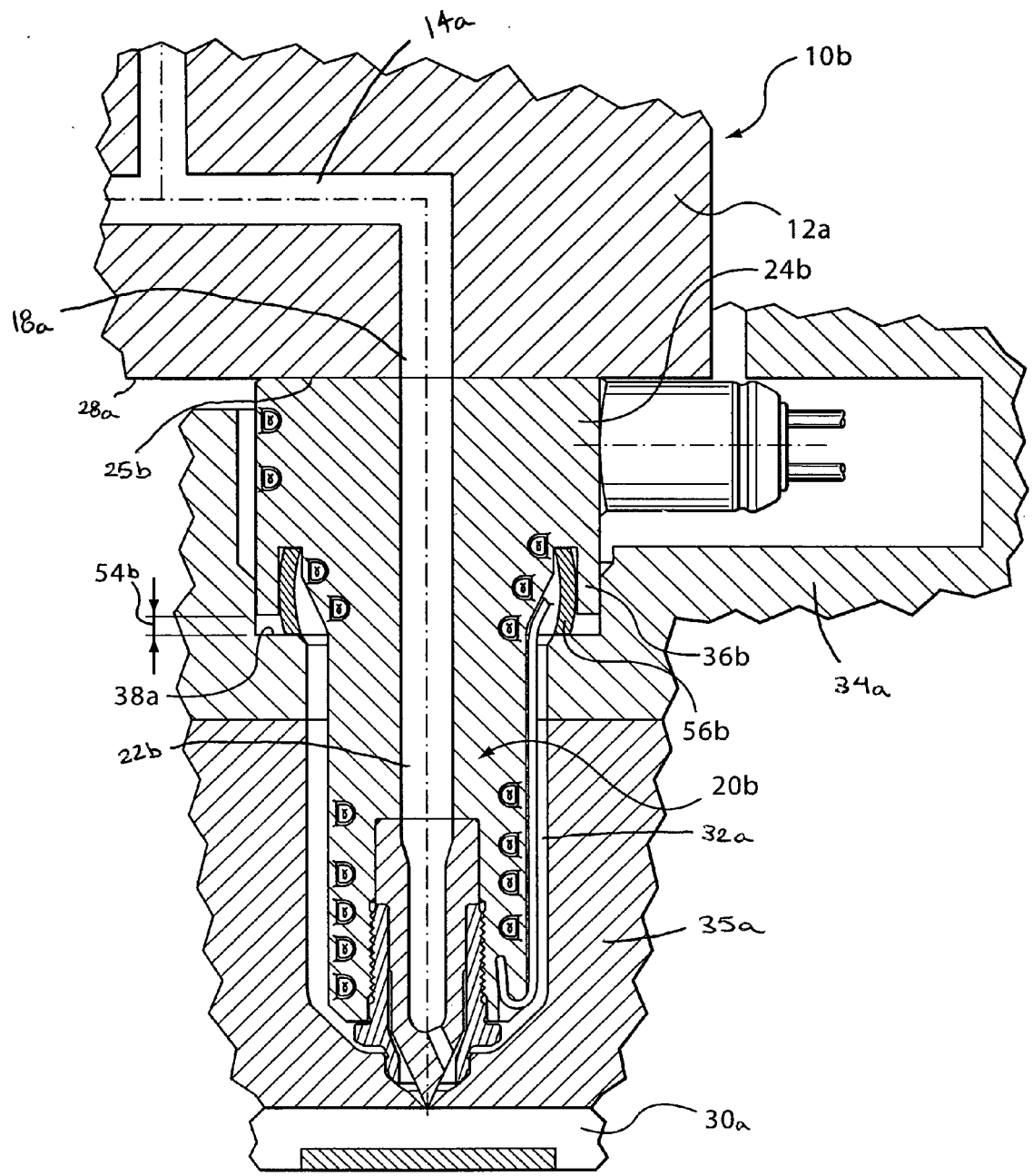
FIG. 4 is a sectional view of an injection molding apparatus according to another embodiment of the present invention, shown in a cold condition.
Figure 5:
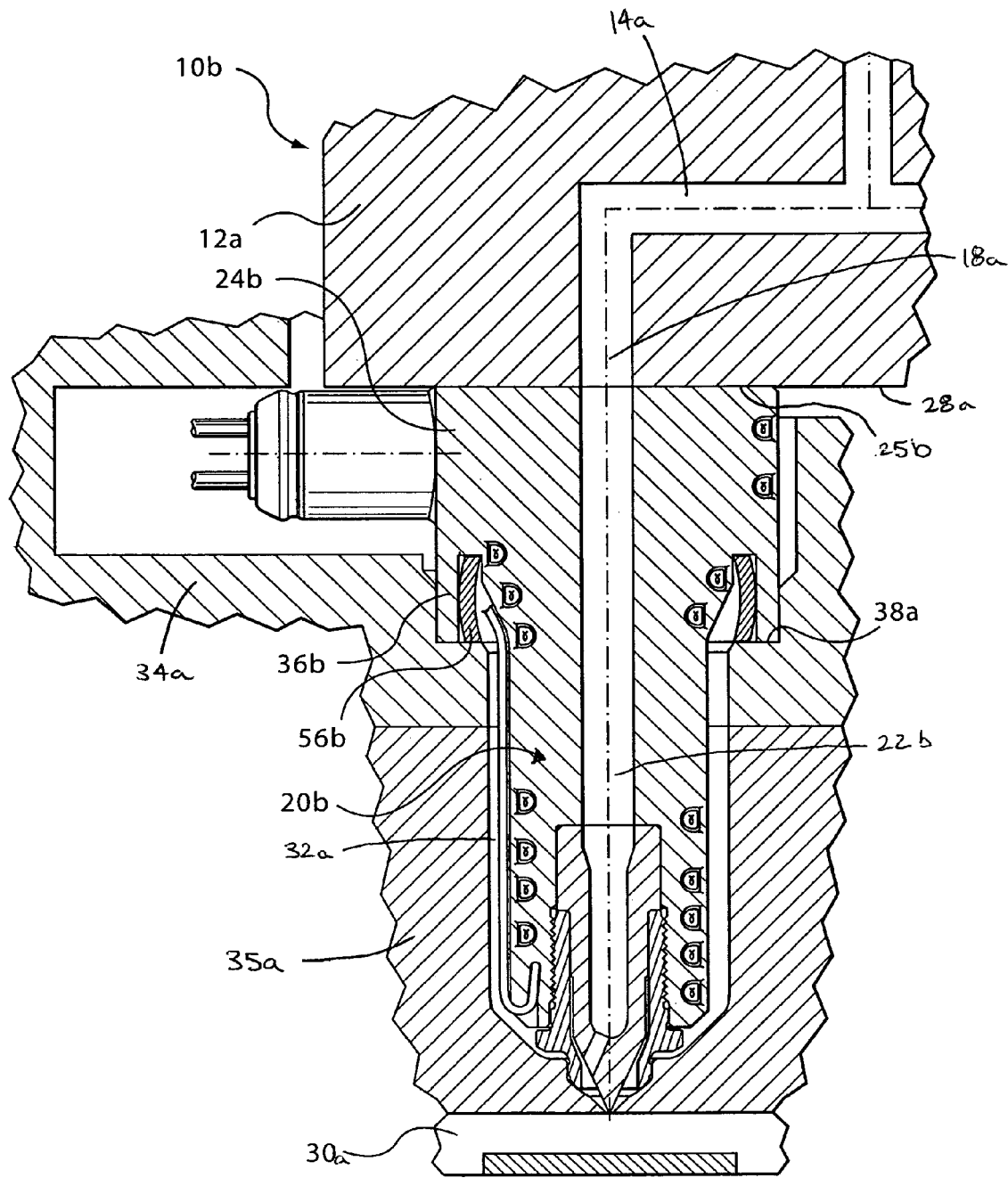
FIG. 5 is a sectional view of the injection molding apparatus of FIG. 4, shown in an operating condition.

Referring to FIGS. 4 and 5, a portion of an injection molding apparatus 10b is shown. Like reference numerals have been used to denote parts similar to those shown in the previous figures, and identical reference numerals have been used to indicate that a component identical to a component previously described can, but need not, be employed.

Injection molding apparatus 10b includes a manifold 12a having a manifold melt channel 14a extending therethrough to an outlet 18a, and a nozzle 20b with a nozzle channel 22b located between manifold 12a and a mold cavity 30a and within a first mold plate 34a and a second mold plate 35a. Nozzle 20b is received in an opening 32a provided in first and second mold plates 34a, 35a. In addition, injection molding apparatus 10b includes a first sealing element 36b and a second sealing element 56b located between nozzle head 24b and a shoulder 38a of mold plate 34a. Compression of either or both first sealing element 36b and second sealing element 56b results in a sealing force between an outlet surface 28a of manifold 12a and inlet surface 25b of nozzle head 24b.

Second sealing element 56b is similar to second sealing element 56 of FIGS. 2 and 3. However, second sealing element 56b has enhanced spring-like characteristics and is preformed as a curved ring having a thin wall. Second sealing element 56b provides sealing in a cold condition and in a heated condition.

First sealing element 36b of nozzle 20b is integral with the nozzle head 24b. Since second sealing element 56b is configured to contact both nozzle head 24b and shoulder 38a prior to first sealing element 36b contacting both, second sealing element 56b provides the entire sealing force between nozzle 20b and manifold 12a when a gap 54b is present between first sealing element 36b and shoulder 38a, as shown in FIG. 4. When the gap 54b is closed, as shown in FIG. 5, first sealing element 36b and second sealing element 56b act in parallel to provide a force on nozzle head 24b that results in a sealing force between outlet surface 28a and inlet surface 25b.

Figure 6:
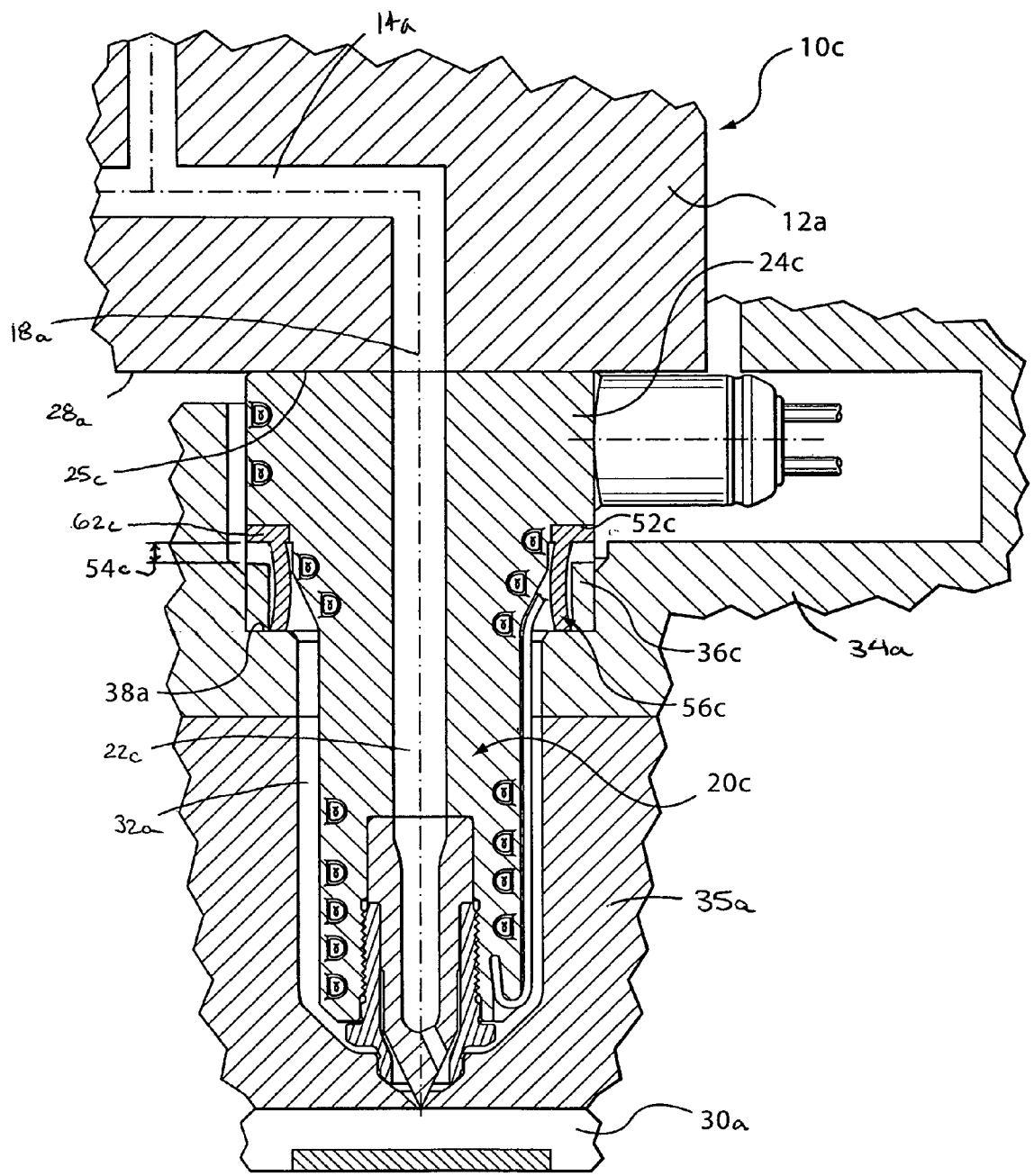
FIG. 6 is a sectional view of an injection molding apparatus according to another embodiment of the present invention, shown in a cold condition.
Figure 7:
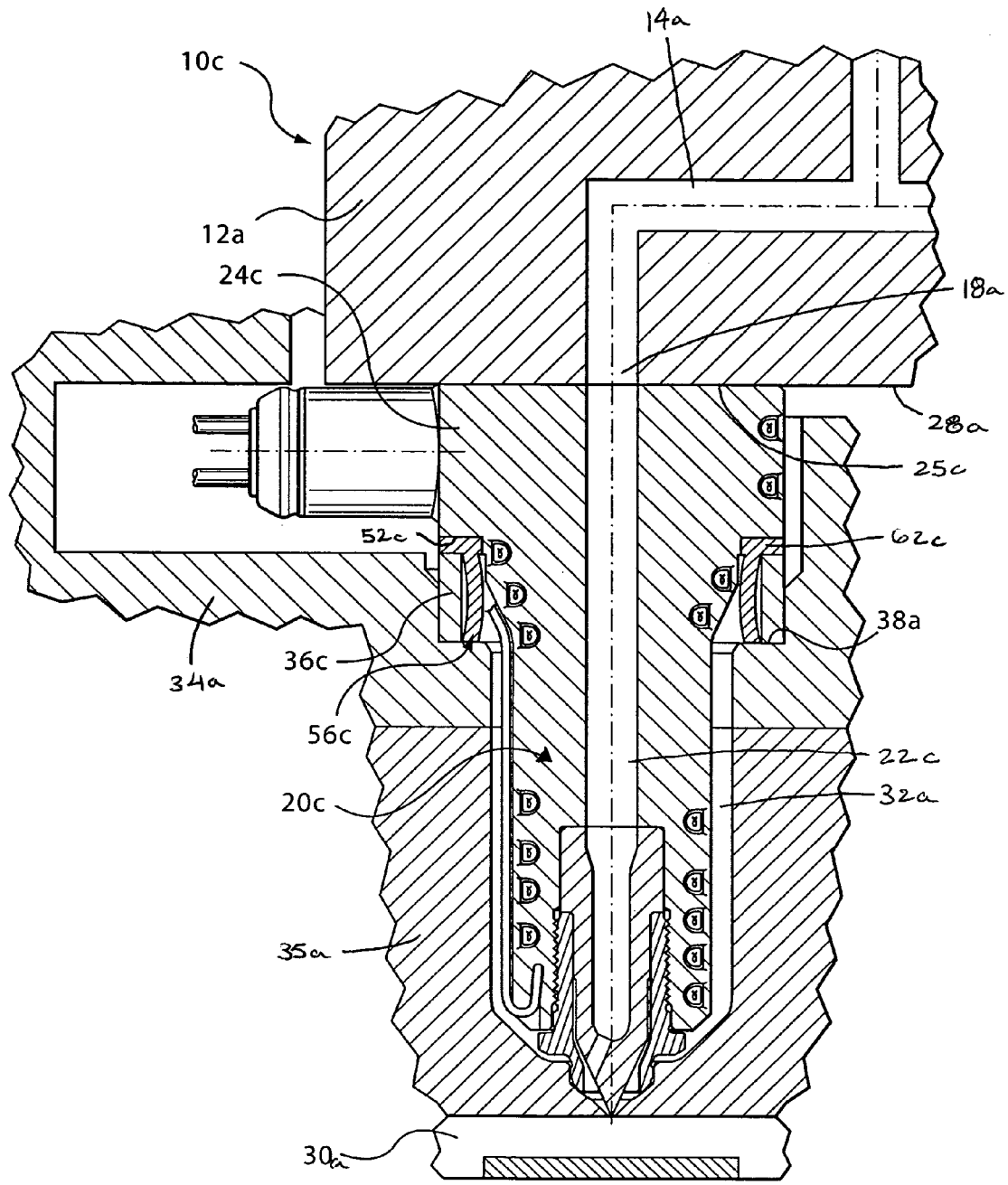
FIG. 7 is a sectional view of the injection molding apparatus of FIG. 6, shown in an operating condition.

Referring to FIGS. 6 and 7, a portion of an injection molding apparatus 10c is shown. Like reference numerals have been used to denote parts similar to those shown in the previous figures, and identical reference numerals have been used to indicate that a component identical to a component previously described can, but need not, be employed.

Injection molding apparatus 10c includes a manifold 12a having a manifold melt channel 14a extending therethrough to an outlet 18a, and a nozzle 20c with a nozzle channel 22c located between manifold 12a and a mold cavity 30a and within a first mold plate 34a and a second mold plate 35a. Nozzle 20c is received in an opening 32a provided in first and second mold plates 34a, 35a. In addition, injection molding apparatus 10c includes a first sealing element 36c and a second sealing element 56c located between a nozzle head 24c and a shoulder 38a of mold plate 34a. Compression of either or both first sealing element 36c and second sealing element 56c results in a sealing force between an outlet surface 28a of manifold 12a and inlet surface 25c of nozzle head 24c.

In the embodiment shown, second sealing element 56c is integrated with a seal mounting collar 62c. Seal mounting collar 62c is received in a groove 52c and coupled to nozzle head 24c of nozzle 20c. First sealing element 36c is separate and spaced from seal mounting collar 62c. Although second sealing element 56c and seal mounting collar 62c are shown as one piece, each component may be manufactured separately and coupled by brazing, soldering, adhering or by applying any other attachment method known in the art.

Similar to the embodiment shown in FIGS. 2 and 3, second sealing element 56c is configured to contact both nozzle head 24c and shoulder 38a prior to first sealing element 36c contacting both. As a result, second sealing element 56c provides the entire sealing force between nozzle 20c and manifold 12a when a gap 54c is present between first sealing element 36b and seal mounting collar 62c, as shown in FIG. 6. When the gap 54c is closed, as shown in FIG. 7, first sealing element 36c and second sealing element 56c act in parallel to provide a force on nozzle head 24c that results in a sealing force between outlet surface 28a and inlet surface 25c.

Figure 8:
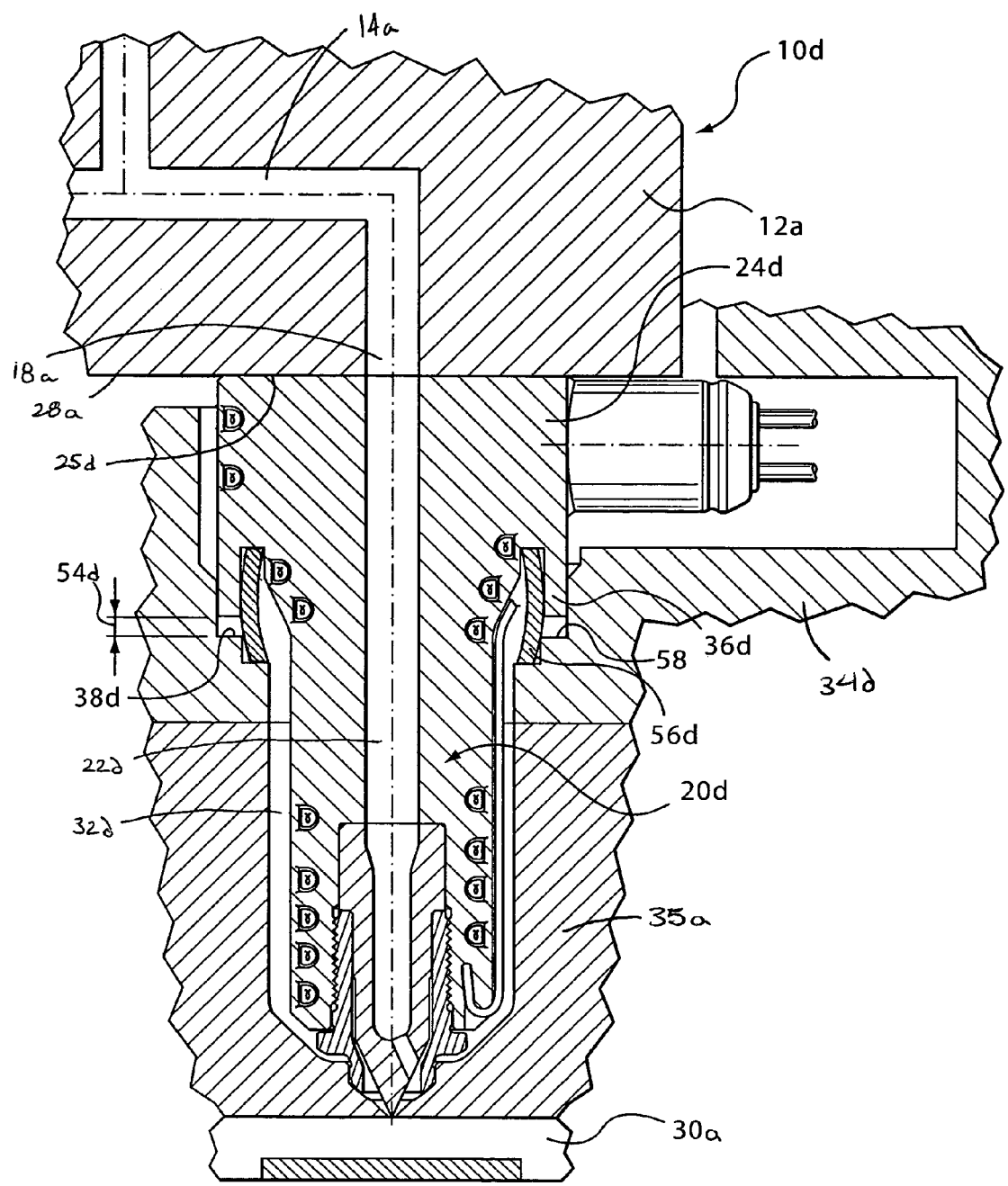
FIG. 8 is a sectional view of an injection molding apparatus according to a further embodiment of the present invention, shown in a cold condition.
Figure 9:
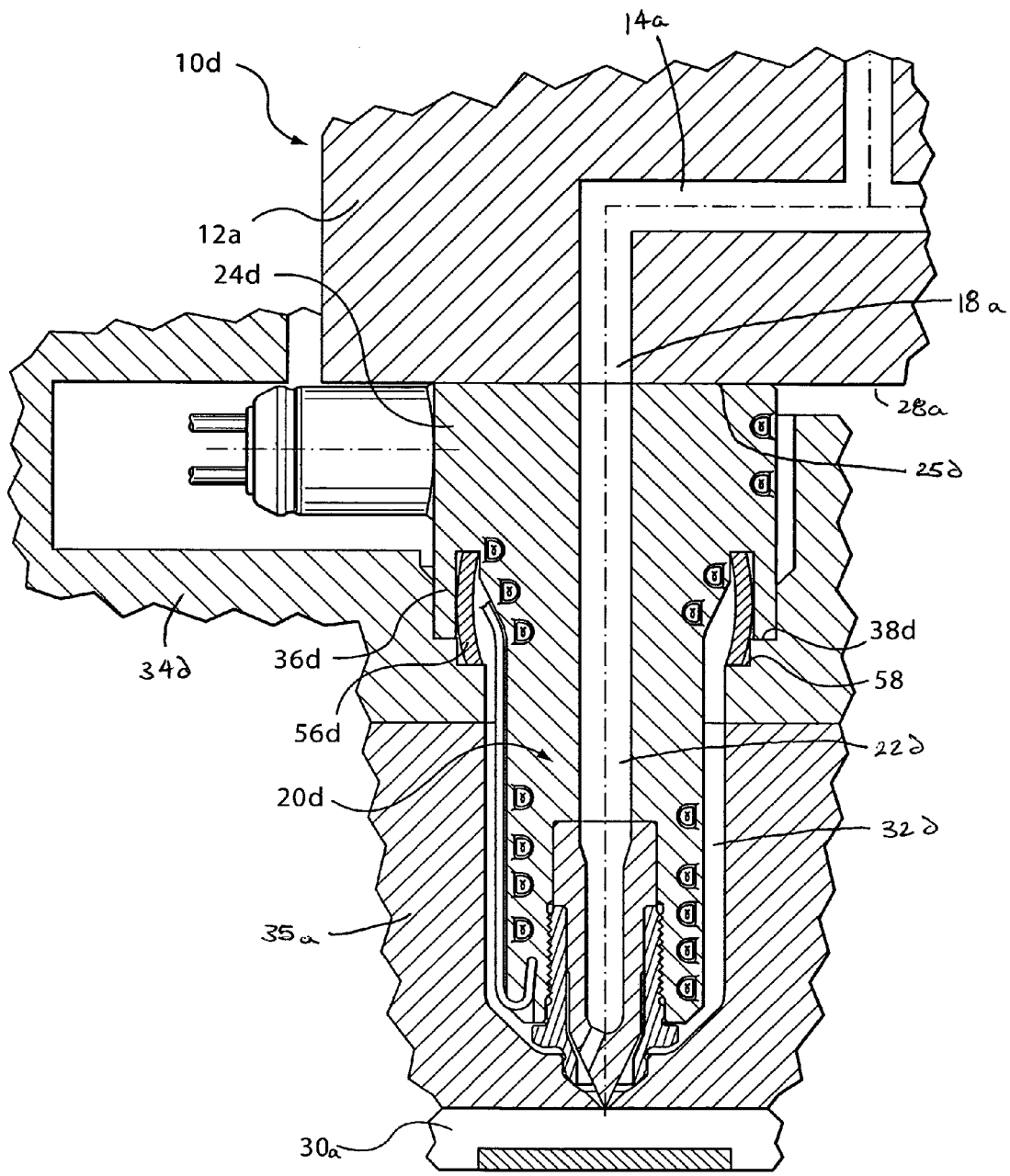
FIG. 9 is the injection molding apparatus of FIG. 8, shown in an operating condition.

A portion of another embodiment of an injection molding apparatus 10d in the cold condition and the operating condition, is shown in FIGS. 8 and 9 respectively. Like reference numerals have been used to denote parts similar to those shown in the previous figures, and identical reference numerals have been used to indicate that a component identical to a component previously described can, but need not, be employed.

Injection molding apparatus 10d includes a manifold 12a having a manifold melt channel 14a extending therethrough to an outlet 18a, and a nozzle 20d with a nozzle channel 22d located between manifold 12a and a mold cavity 30a and within a first mold plate 34d and a second mold plate 35a. Nozzle 20d is received in an opening 32d provided in first and second mold plates 34d, 35a. In addition, injection molding apparatus 10d includes a first sealing element 36d located between a nozzle head 24d and a shoulder 38d of mold plate 34d and a second sealing element 56d located between a step 58 in shoulder 38d of mold plate 34d and nozzle head 24d. Similar to the embodiments previously described, compression of either or both first sealing element 36d and second sealing element 56d result in a sealing force between an outlet surface 28a of manifold 12a and an inlet surface 25d of nozzle head 24d.

In this embodiment, second sealing element 56d is sandwiched between nozzle head 24d and step 58 provided in shoulder 38d of mold plate 34d. First sealing element 36d is integral with nozzle head 24d of nozzle 20d. The inclusion of step 58 aids in the alignment of second sealing element 56d when injection molding apparatus 10d is in a cold condition.

This arrangement operates in a manner similar to the embodiments previously described. In particular, second sealing element 56d provides the entire sealing force between nozzle 20d and manifold 12a when a gap 54d is present between first sealing element 36d and shoulder 38d, as shown in FIG. 8. When the gap 54d is closed, as shown in FIG. 9, first sealing element 36d and second sealing element 56d act in parallel to provide a force on nozzle head 24d that results in a sealing force between outlet surface 28a and inlet surface 25d.

Figure 10:
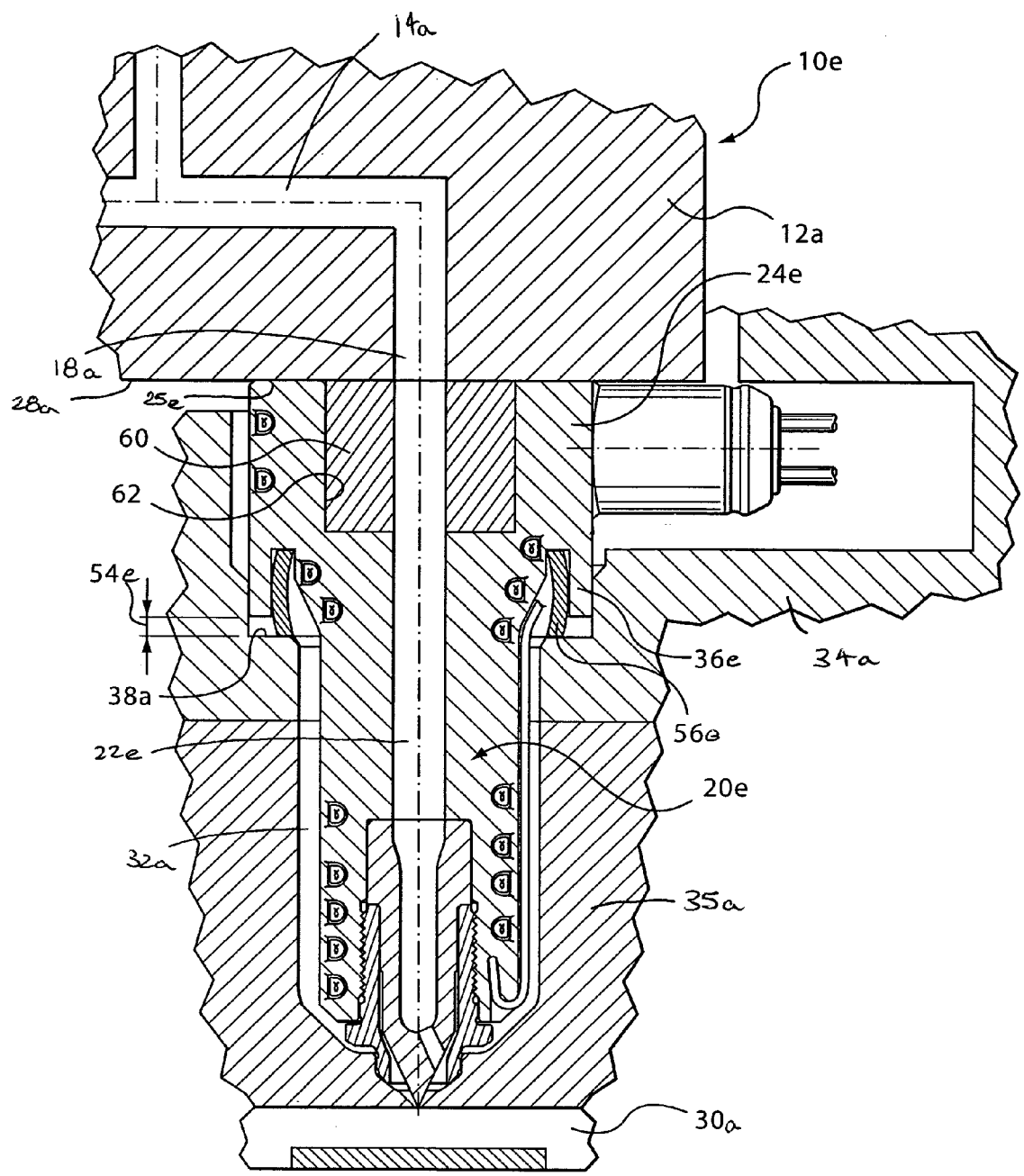
FIG. 10 is a sectional view of an injection molding apparatus according to still another embodiment of the present invention, shown in a cold condition.
Figure 11:
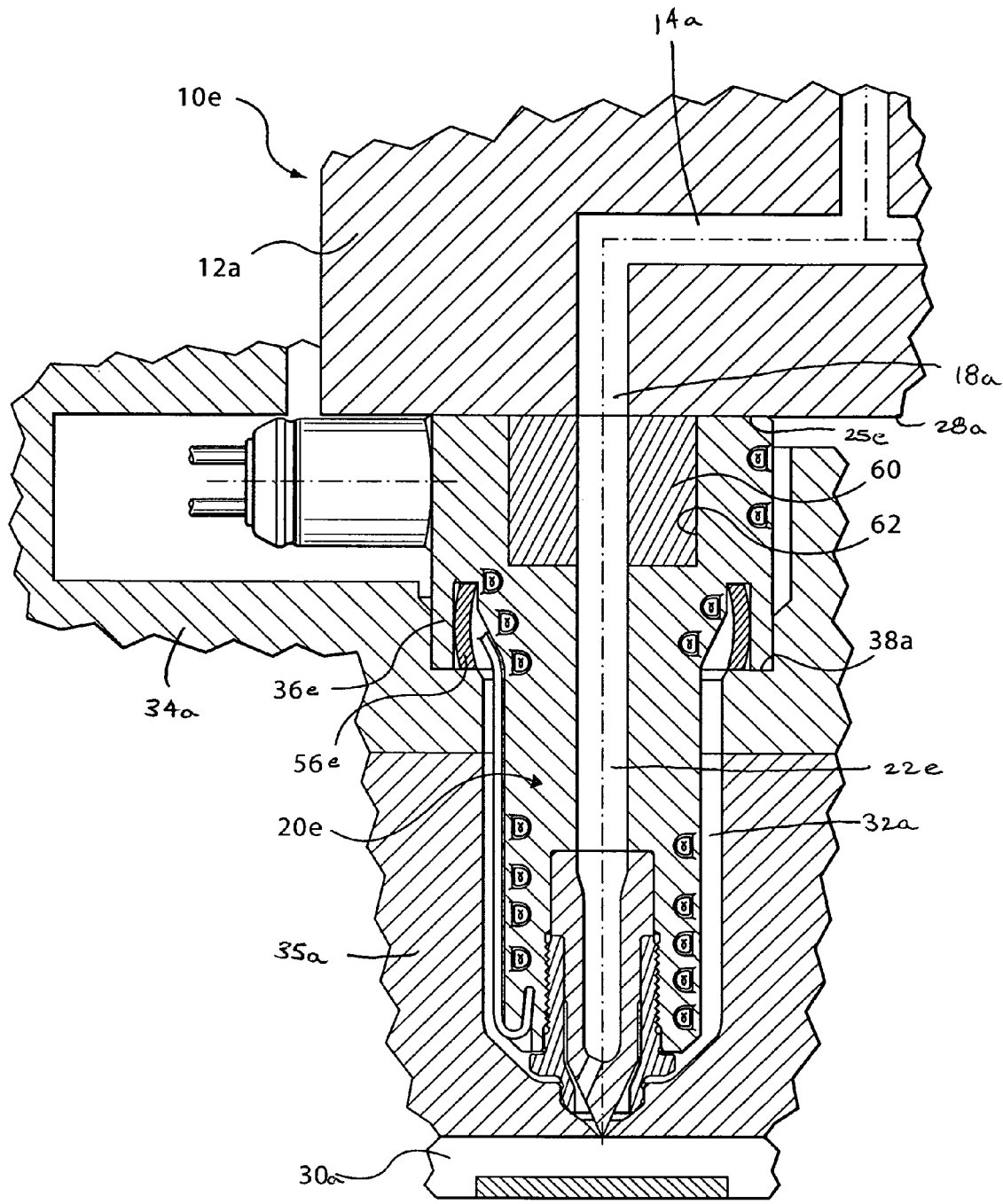
FIG. 11 is a sectional view of the injection molding apparatus of FIG. 10, shown in an operating condition.

A portion of another embodiment of an injection molding apparatus 10e in the cold condition and the operating condition, is shown in FIGS. 10 and 11 respectively. Like reference numerals have been used to denote parts similar to those shown in the previous figures, and identical reference numerals have been used to indicate that a component identical to a component previously described can, but need not, be employed.

Injection molding apparatus 10e is similar to the embodiment shown in FIGS. 4 and 5. The apparatus includes a manifold 12a having a manifold melt channel 14a extending therethrough to an outlet 18a, and a nozzle 20e with a nozzle channel 22e located between manifold 12a and a mold cavity 30a and within a first mold plate 34a and a second mold plate 35a. Nozzle 20e is received in an opening 32a provided in first and second mold plates 34a, 35a. In addition, injection molding apparatus 10e includes a first sealing element 36e and a second sealing element 56e. The sealing elements are located between a nozzle head 24e and a shoulder 38a of mold plate 34a. A gap 54e is shown in FIG. 10 between first sealing element 36e and shoulder 38a. During operation, gap 54e is closed, as shown in FIG. 11, and first sealing element 36e and second sealing element 56e act in parallel to provide a force on nozzle head 24e that results in a sealing force between outlet surface 28a and inlet surface 25e.

This embodiment differs from the embodiment shown in FIGS. 4 and 5 in that it includes an insert 60 that is received in a bore 62 provided in nozzle head 24e of nozzle 20e. Bore 62 extends into nozzle head 24e from inlet surface 25e. The insert 60 has a higher coefficient of thermal expansion than nozzle 20e to provide an additional seal between nozzle 20e and manifold 12a. Other than the addition of insert 60, apparatus 10e functions similar to the embodiments previously described.

Figure 12:
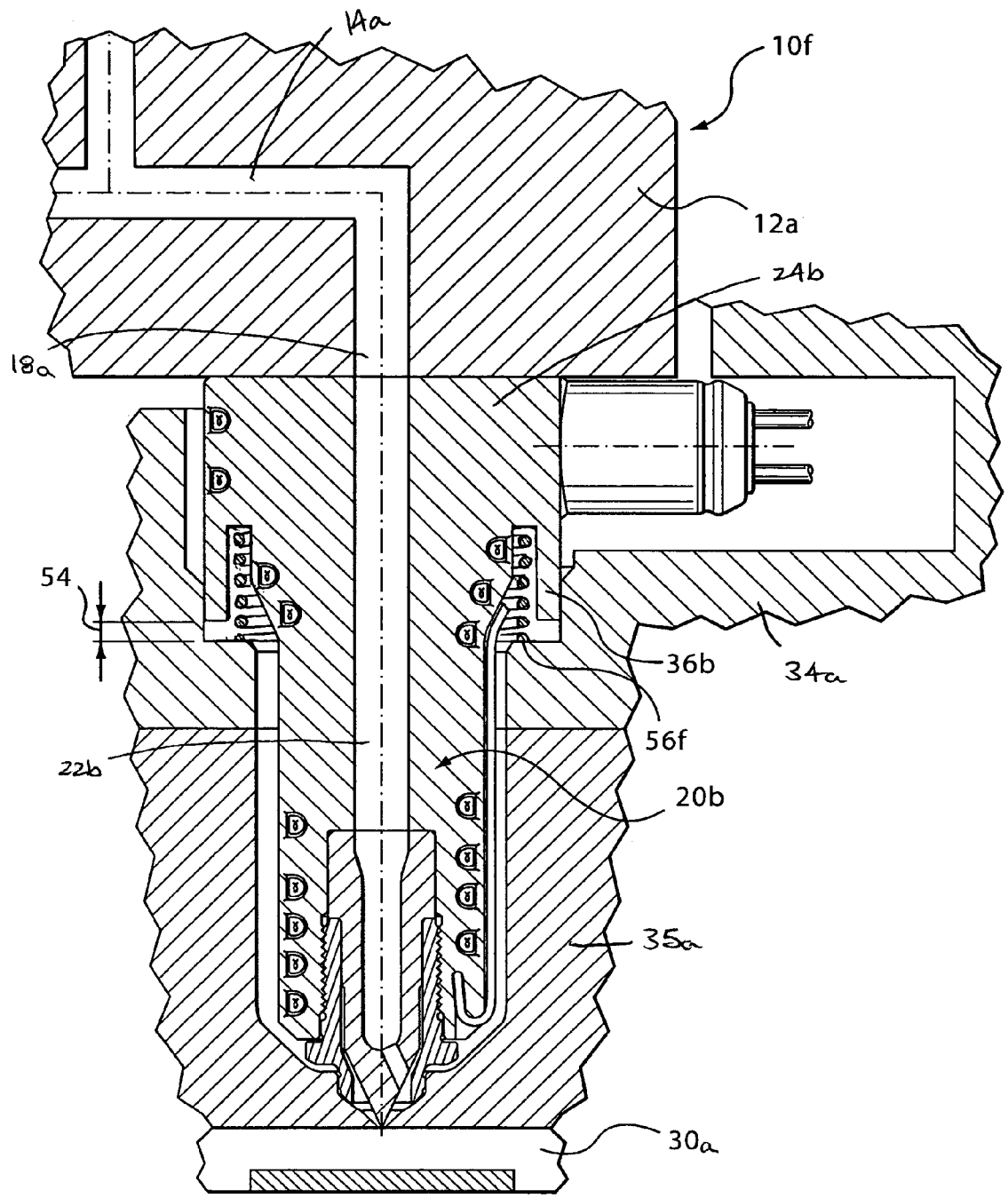
FIG. 12 is a sectional view of an injection molding apparatus according to another embodiment of the present invention, shown in a cold condition.
Figure 13:
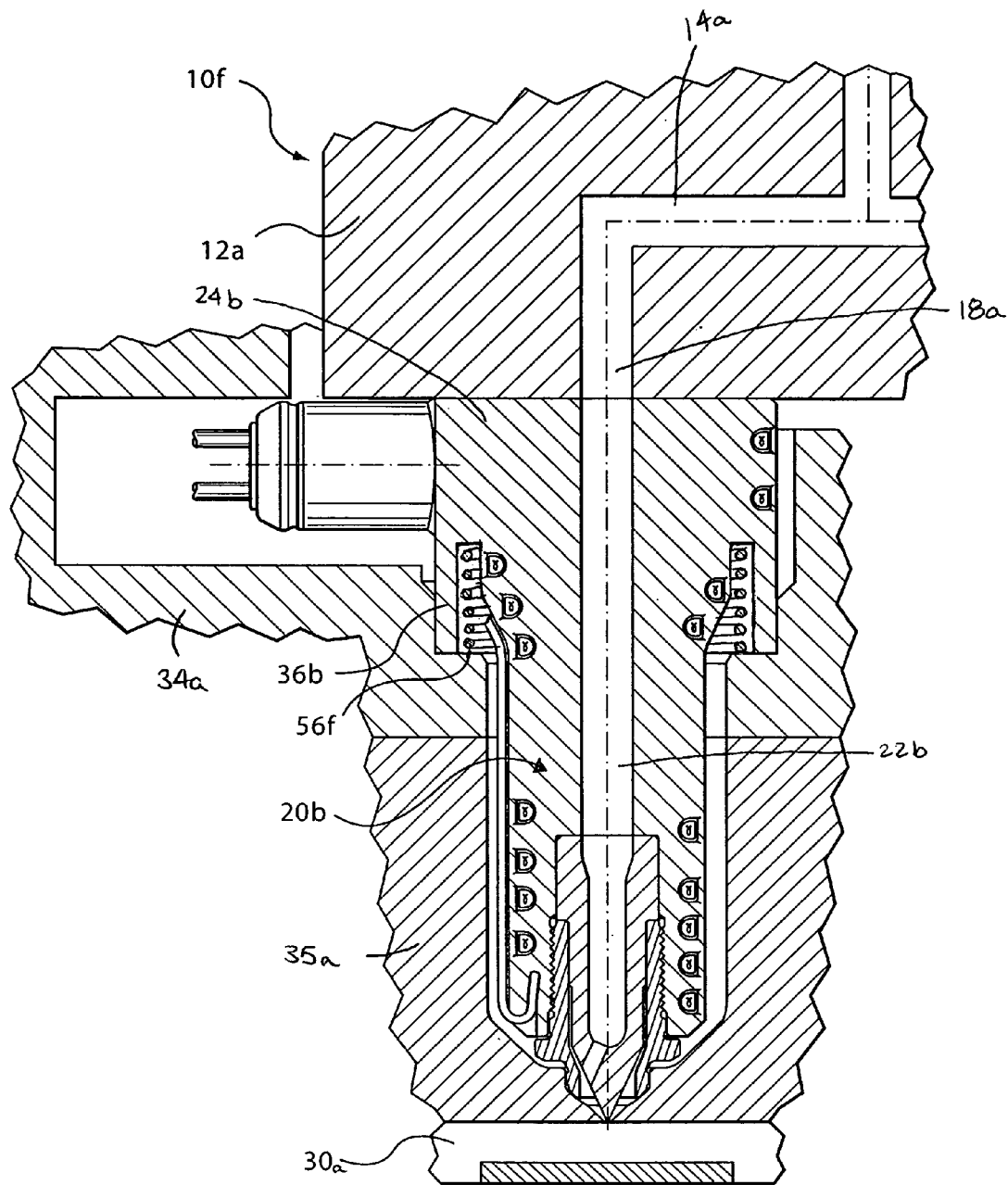
FIG. 13 is a sectional view of the injection molding apparatus of FIG. 12, shown in an operating condition.

A portion of another embodiment of an injection molding apparatus 10f in the cold condition and the operating condition, is shown in FIGS. 12 and 13 respectively. Like reference numerals have been used to denote parts similar to those shown in the previous figures, and identical reference numerals have been used to indicate that a component identical to that described in a previous embodiment can, but need not, be employed.

Injection molding apparatus 10f is similar to the embodiment shown in FIGS. 4 and 5. The apparatus includes a manifold 12a having a manifold melt channel 14a extending therethrough to an outlet 18a, and a nozzle 20b with a nozzle channel 22b located between manifold 12a and a mold cavity 30a and within a first mold plate 34a and a second mold plate 35a. Nozzle 20b is received in an opening 32a provided in first and second mold plates 34a, 35a. In addition, injection molding apparatus 10f includes a first sealing element 36b. Apparatus 10f differs from apparatus 10b, shown in FIGS. 4 and 5, because second sealing element 56b has been replaced with a spring 56f. Spring 56f may be any spring known in the art, for example a Belleville disc or a helical spring, or any other suitable resilient device capable of deflecting under pressure and returning to a previous position after release of such pressure. The sealing elements are located between a nozzle head 24b and a shoulder 38a of mold plate 34a.

It will be appreciated by a person skilled in the art that valve gated nozzles could be used instead of the thermal gated nozzles shown in FIGS. 1 through 13. Furthermore, one of ordinary skill in the art would appreciate that the present invention could be utilized in systems utilizing multiple nozzles with a single cavity or multi-tip nozzles.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold having a manifold melt channel extending therethrough to an outlet;
   a mold plate having an opening and a shoulder disposed about the opening;
   a nozzle having a nozzle head, and a nozzle melt channel extending through the nozzle;
   a first sealing element disposed between the nozzle head and the shoulder; and
   a second sealing element disposed between the nozzle head and the shoulder and contacting the nozzle head and the shoulder when the injection molding apparatus is in a cold condition;
   wherein the first sealing element contacts only one of the nozzle head and the shoulder when the injection molding apparatus is in the cold condition.

2. The injection molding apparatus of claim 1, wherein the manifold includes an outlet surface disposed about the outlet, the nozzle head includes an inlet surface, and the inlet surface abuts the outlet surface.

3. The injection molding apparatus of claim 1, wherein the first sealing element is less compressible than the second sealing element.

4. The injection molding apparatus of claim 1, wherein the second sealing element is one of a Belleville disc and a helical spring.

5. The injection molding apparatus of claim 1, wherein the first sealing element is integrated into the nozzle head.

6. The injection molding apparatus of claim 1, further comprising an insert disposed in a bore in the nozzle head.

7. The injection molding apparatus of claim 6, wherein the insert abuts an outlet surface disposed about the outlet of the manifold.

8. The injection molding apparatus of claim 6, wherein the insert is constructed from an insert material and the nozzle is constructed from a nozzle material and the insert material has a coefficient of thermal expansion higher than the coefficient of thermal expansion of the nozzle material.

9. The injection molding apparatus of claim 1, further comprising a seal mounting collar coupled to the nozzle head and to the second sealing element.

10. The injection molding apparatus of claim 9, wherein the nozzle head includes a groove and the seal mounting collar is coupled to the nozzle head in the groove.

11. The injection molding apparatus of claim 1, wherein the shoulder includes a step and an end of the second sealing element is disposed in the step.

12. The injection molding apparatus of claim 1, wherein the first sealing element is annular.

13. The injection molding apparatus of claim 1, wherein the second sealing element is annular.

14. An injection molding apparatus comprising:
    a manifold having a manifold melt channel extending therethrough to an outlet;
    a mold plate having an opening and a shoulder disposed about the opening;
    a nozzle having a nozzle head, and a nozzle melt channel extending through the nozzle;
    a first sealing element disposed between the nozzle head and the shoulder; and
    a second sealing element disposed between the nozzle head and the shoulder;
    wherein the second sealing element is disposed entirely radially inward from the first sealing element toward a longitudinal axis of the nozzle.

15. The injection molding apparatus of claim 14, wherein the manifold includes an outlet surface disposed about the outlet, the nozzle head includes an inlet surface, and the inlet surface abuts the outlet surface.

16. The injection molding apparatus of claim 14, wherein the first sealing element is more compressible than the second sealing element.

17. The injection molding apparatus of claim 14, wherein the second sealing element is one of a Belleville disc and helical spring.

18. The injection molding apparatus of claim 14, wherein the first sealing element is integrated into the nozzle head.

19. The injection molding apparatus of claim 14, further comprising an insert disposed in a bore in the nozzle head.

20. The injection molding apparatus of claim 19, wherein the insert abuts an outlet surface disposed about the outlet of the manifold.

21. The injection molding apparatus of claim 19, wherein the insert is constructed from an insert material and the nozzle is constructed from a nozzle material and the insert material has a coefficient of thermal expansion higher than the coefficient of thermal expansion of the nozzle material.

22. The injection molding apparatus of claim 14, further comprising a seal mounting collar coupled to the nozzle head and to the second sealing element.

23. The injection molding apparatus of claim 22, wherein the seal mounting collar is disposed between the first sealing element and the nozzle head.

24. The injection molding apparatus of claim 22, wherein the nozzle head includes a groove and the seal mounting collar is coupled to the nozzle head in the groove.

25. The injection molding apparatus of claim 14, wherein the shoulder includes a step and an end of the second sealing element is disposed in the step.

26. The injection molding apparatus of claim 14, wherein the first sealing element is annular.

27. The injection molding apparatus of claim 14, wherein the second sealing element is annular.

28. An injection molding apparatus comprising:
    a manifold having a manifold melt channel extending therethrough to an outlet, and an outlet surface disposed about the outlet;
    a mold plate having an opening and a shoulder disposed about the opening;

a nozzle having a nozzle head, and a nozzle melt channel extending through the nozzle, wherein the nozzle head includes an inlet surface that abuts the outlet surface;

a first annular sealing element that is coupled to the nozzle head in a groove and disposed between the nozzle head and the shoulder; and a second annular sealing element contacting the nozzle head and the shoulder when the injection molding apparatus is in a cold condition and disposed radially inward of the first sealing element toward a longitudinal axis of the nozzle, wherein the first sealing element contacts only one of the nozzle head and the shoulder when the injection molding apparatus is in the cold condition.

29. The injection molding apparatus of claim 28, wherein the first sealing element contacts both the nozzle head and the shoulder when the injection molding apparatus is in a heated condition.

30. The injection molding apparatus of claim 1, wherein the first sealing element contacts both the nozzle head and the shoulder when the injection molding apparatus is in a heated condition.

31. The injection molding apparatus of claim 14, wherein the second sealing element contacts both the nozzle head and the shoulder when the injection molding apparatus is in a cold condition, and the first sealing element contacts only one of the nozzle head and the shoulder when the injection molding apparatus is in the cold condition.

32. The injection molding apparatus of claim 31, wherein the first sealing element contacts both the nozzle head and the shoulder when the injection molding apparatus is in a heated condition.

* * * * *